3,282,779
COMPOSITIONS CONTAINING A TETRACYCLINE ANTIBIOTIC AND POTENTIATING AGENTS THEREFOR
Joseph M. Pensack, Trenton, N.J., and Charles N. Huhtanen, New Hope, Pa., assignors to American Cyanamid Company, Stamford, Conn., a corporation of Maine
No Drawing. Filed Jan. 15, 1963, Ser. No. 251,477
4 Claims. (Cl. 167—53)

This invention relates to novel compositions containing a tetracycline antibiotic and a potentiating agent which are highly useful in controlling infectious diseases and in stimulating the growth of animals. More particularly, the present invention is concerned with an animal feed composition for non-ruminants, such as poultry and swine, containing a tetracycline antibiotic and a novel group of adjuvants which promote increased absorption of the antibiotic and assimilation thereof by the blood and tissue of the animal.

Although the broad-spectrum antibiotics chlortetracycline, tetracycline, oxytetracycline, and demethylchlortetracycline have been found to be extremely effective for controlling infectious diseases and for stimulating growth in animals; nevertheless, due to incomplete absorption thereof by the body of the animal, believed to be due at least in part to the presence of calcium and other metallic cations in the diet, full utilization of such antibiotics has never been achieved. Since such antibiotics are relatively expensive, it is most desirable to provide a means whereby their effectiveness is fully realized.

It is known that the standard sources for calcium and phosphorus in animal diets, particularly poultry diets, are generally calcium carbonate, calcium hydrogen phosphate and bone meal. These materials, while generally considered necessary for normal poultry growth, have been found to markedly lower the blood levels of the tetracycline antibiotics. Since improvement in health is normally related to blood levels of antibiotic, efforts have been made to overcome the deleterious effects of calcium on the blood levels of the antibiotic without eliminating calcium from the diet.

While compounds such as terephthalic acid have been employed to increase blood levels of antibiotic, such materials have not been wholly effective since it has been found that the blood level of antibiotic cannot be significantly increased above that which is attained with an optimum dosage even though the dosage is increased two- or three-fold.

Attempts have also been made to improve blood levels from a given amount of tetracycline antibiotic by employing a low calcium diet, i.e., a diet containing well below 0.8% calcium. However, this method has not proved to be entirely satisfactory since a normal chick diet requires about 0.8% calcium for normal growth. Thus continuous low calcium diet cannot be tolerated if normal growth is to be obtained.

A still further attempt to increase blood levels from a given amount of tetracycline antibiotic has been made wherein calcium sulfate is employed as the sole added source of calcium in the diet. This method has met with considerable success since it provides blood levels of tetracycline antibiotic comparable to those obtained with the low calcium diet or the feed containing terephthalic acid. However, this process like the others is not entirely satisfactory since there is some waste involved because the antibiotic is not completely absorbed from the alimentary tract. Furthermore, this method of treatment has the disadvantage that relatively high levels of calcium sulfate tend to produce a wet litter which is an excellent breeding ground for infectious microorganisms.

It would be most desirable commercially to obtain compositions which would permit the effectiveness of the tetracycline antibiotics to be appreciably enhanced. It has been found that this most desirable object can be achieved with the novel compositions of the present invention which comprise a tetracycline antibiotic, that is, any antimicrobially active form of the antibiotics tetracycline, chlortetracycline, oxytetracycline, demethylchlortetracycline and structurally related substances and the novel potentiating agents as described more fully hereinafter.

Such compositions are highly useful for administration to domesticated animals in feeds or directly as medicinal agents. These compositions show remarkably enhanced absorption of the antibiotic resulting in much higher concentrations in the blood of the animals, with the use of a given amount of the antibiotic, or conversely resulting in equivalent blood levels with much less of the antibiotic compound than it is possible to obtain with the antibiotic alone.

The novel potentiating agents of this invention may be administered simultaneously with the administration of the tetracycline antibiotic. Generally the quantity of agent is limited. Excellent results have been obtained with amounts equivalent to between 1 and 5 parts by weight per 1,000 parts by weight of the feed. The adjuvants may be employed in various forms, for example, pills, tablets, capsules, in solution or in fine granules and may be administered in various ways, as by force feeding or in the drinking water or feed. It is preferred that the latter method of administration be employed since it is the easiest method of administration, requires no additional effort on the part of the farmer when the feed is purchased as a premix and provides a means for obtaining optimum effectiveness of the adjuvants and the antibiotic at minimum cost. Optimum ratios of adjuvant to antibiotic can be readily controlled. In addition to the adjuvant and antibiotic, the feed may contain nutritionally-balanced quantities of carbohydrates, proteins, vitamins and minerals. If tablets, capsules, pills, pellets or the like are employed, they may contain in addition to the adjuvant and antibiotic, excipients and diluents such as sugars, starches and the like.

Any of the commercially available and commonly used tetracycline antibiotics such as tetracycline, chlortetracycline, oxytetracycline, demethylchlortetracycline, and the like may be used. Chlortetracycline, however, is preferred because of its already wide acceptance as an animal feed additive of choice and because it is more effective than the other tetracycline antibiotics.

Preferably, the tetracycline antibiotic is present to the extent of between about 50 and 2,000 parts per million based on the weight of the feed with the optimum amount being about 200–400 parts per million.

The novel potentiating agents of this invention may be represented by the following general formula:

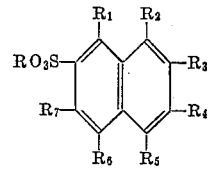

wherein R is H or alkali metal; $R_1$ is H or $NH_2$; $R_2$ and $R_6$ are H, OH, $SO_3H$, or $SO_3$-alkali metal; $R_3$ is H, $NH^2$, $SO_3H$, $SO_3$-alkali metal, substituted benzoylamino, carbamoyl or (substituted phenyl) carbamoyl, i.e.,

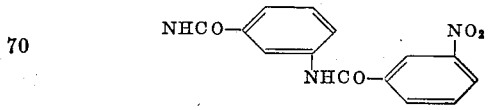

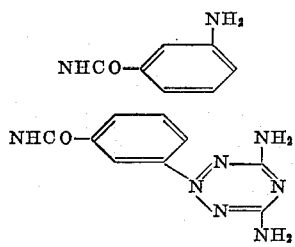

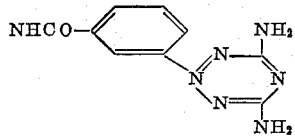

$R_4$ is H, $NH_2$, OH, $NH_2 \cdot HCl$, $NH-\overset{NH}{\underset{}{C}}-NH-\overset{NH}{\underset{}{C}}-NH_2$
or —N=N—Z, wherein Z is a member of the group consisting of phenyl, substituted phenyl, substituted amino, and substituted heterocyclic radicals, i.e.,

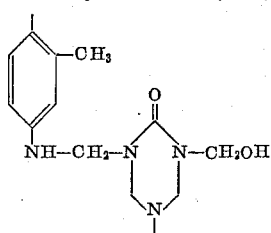

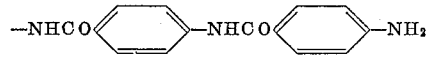

and

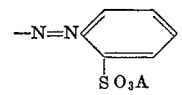

$R_5$ is H, or substituted phenylazo, i.e.,

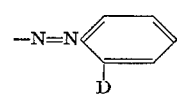

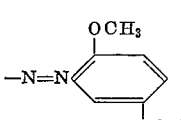

and

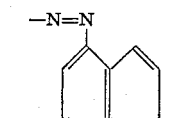

$R_7$ is H or phenylazo; A is H or alkali metal and D is H or OH.

In a more preferred embodiment of the present invention it has been found that the 5,7-disulphonic compounds of the following formula are preferred potentiating agents.

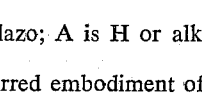

wherein R is H or alkali metal; $R_1$ is H or $NH_2$; $R_2$ is H or OH; $R_3$ is H or substituted benzoylamino, i.e.,

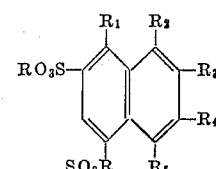

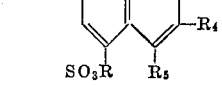

$R_4$ is H, $NH_2$, OH, $NH_2 \cdot HCl$, $NH-\overset{NH}{\underset{}{C}}-NH-\overset{NH}{\underset{}{C}}-NH_2$ or —N=N—Z, wherein Z is a member of the group consisting of phenyl, substituted phenyl and substituted heterocyclic radicals, i.e.,

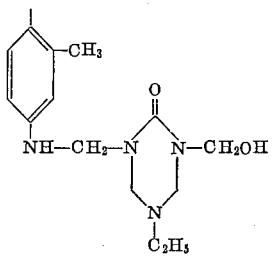

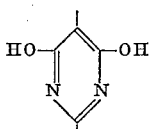

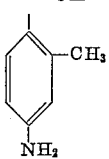

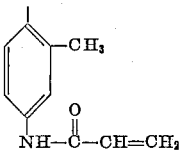

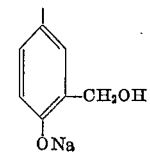

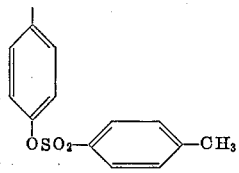

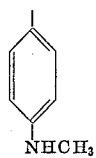

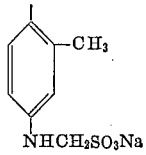

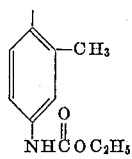

and

and $R_5$ is H or phenylazo.

In a still more preferred embodiment of the present invention it has been found that the compounds having the general formula given below appear to produce a most remarkable increase in antibiotic blood levels in animals.

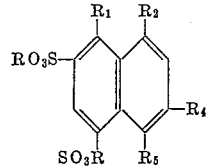

wherein R is H or alkali metal; $R_1$ is H or $NH_2$; $R_2$ is H or OH; $R_4$ is H, OH, $NH_2$, or —N=N—Z, wherein Z is a member of the group consisting of phenyl, substituted-phenyl and substituted-heterocyclic radicals, i.e.,

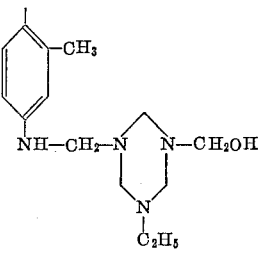

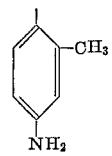

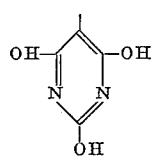

and

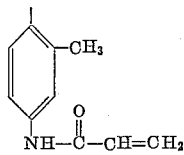

The following compounds, which have been found to be useful as potentiating agents, are known to the art and their preparation will not be described:

8-amino-1-napthol-5,7-disulfonic acid;
3-hydroxy-4-phenylazo-5,7-naphthalene sulfonic acid disodium salt;
disodium 8-amino-1-hydroxy-7-(3-nitrophenylazo)-2-phenylazo-naphthalene-3,6-disulfonate;
1,5-naphthalenedisulfonic acid, 7-[p-(p-aminobenzamido)-benzamido]-disodium salt;
5,7-naphthalenedisulfonic acid, 3-amino-, disodium salt;
1,3-naphthalene disulfonic acid;
5-amino-4-hydroxy-6-(4-nitrophenylazo)-3-phenylazo-2,7-naphthalenedisulfonic acid;
3-amino-5-naphthol-7-sulfonic acid;
1-[3-(5,7-disulfo)naphthyl] biguanide;
5-(m-tolylazo)-6-hydroxynaphthalene-2,7-disulfonic acid;
3-amino-5,7-naphthalenedisulfonic acid hydrochloride;
5,7-naphthalenedisulfonic acid-2-[m-(m-nitrobenzamido)-benzamido]-disodium salt;
3-naphthol-5,7-disulfonic acid;
2,7-naphthalene-disulfonic acid-4,5-dihydroxy-3-(6-methoxy-4-nitro-m-tolylazo);
and 8-amino-5,7-naphthalene disulfonic acid.

The preparation of other related compounds which have also been found to be highly effective as potentiators for antibiotics will be described in the examples which follow.
The invention will be further described in conjunction with the following specific examples.

EXAMPLE 1

*Preparation of 5,7-naphthalenedisulfonic acid, 3-(4-acrylamido-o-tolylazo), disodium salt*

5.09 g. of glacial acrylic acid and 7.66 g. of phosphorus oxychloride were added to 300 ml. of dry pyridine at such a rate that the temperature of the mixture did not exceed 20° C. Following this addition the temperature of the mixture was lowered to from 0°–5° C. At this temperature, 14.53 g. of the azo compound derived from diazotizing amino G acid and coupling into m-toluidine was added to the reaction mixture. The temperature was raised to 95° C. and maintained at this temperature for 3½ hours. The mixture was then cooled to room temperature and 500 ml. of water added thereto. Pyridine was then steam stripped from the mixture. The remaining solution was treated with sodium chloride at 70° C. to precipitate the product. The product was collected by filtration and washed with 20% brine. The product was then dried at 55° C.

EXAMPLE 2

*Preparation of 5,7 - naphthalenedisulfonic acid - 3 - (P-hydroxyphenylazo)-p-toluene sulfonate, disodium salt*

9.77 g. of the azo compound derived from coupling diazotized amino G acid into phenol by the known procedure was dissolved in 250 ml. of water containing 0.92 g. of sodium hydroxide and 2.23 g. of sodium carbonate. The temperature was raised to 40° C., and there was added with stirring a solution of 4.19 g. of p-toluene-sulfonyl chloride in 20 ml. of acetone. The solution was stirred at 40°–45° for one hour, then raised to 50° and clean sodium chloride added to precipitate the product. The product was collected by filtration and washed with 200 ml. of 20% brine solution. Purification of the product was achieved by dissolution in dimethylformamide at ambient temperature, filtration and recrystallization from acetone.

EXAMPLE 3

*Preparation of 5,7-naphthalenedisulfonic acid, 3-(alpha 4 - dihydroxy-m-tolylazo)-ar-sodium derivative, disodium salt*

91 g. of amino G acid was diazotized with hydrochloric acid and sodium nitrite in the usual manner. The cold diazonium slurry was added at ambient temperature to a well-stirred solution of 37.24 g. of saligenin (o-hydroxybenzyl alcohol) in 500 ml. of water containing 0.4 N sodium hydroxide and 0.15 N sodium carbonate. After completion of the coupling, the product was precipitated by gradual addition of acid to a positive test on methyl red indicator paper. The product was collected by filtration and washed with 20% brine. The washed product was then dried at 55° C. and collected.

EXAMPLE 4

*Preparation of 5,7-naphthalenedisulfonic acid-S-[4-(sulfomethylamino)-o-tolylazo], trisodium salt*

42.4 g. of 71.6% amino G acid was dispersed in 600 ml. of H₂O and 25 ml. of 0.3 N hydrochloric acid. This mixture was chilled to +2° C. and 14 ml. of 40% sodium nitrite sodium was added thereto and the mixture stirred for one hour. Excess nitrite was destroyed and a solution of 68 g. of sodium acetate trihydrate in 400 ml. of water was added to the mixture. This was followed by the addition of 24.5 g. of m-toluidine omega salt and the mixture was stirred for one hour. 50 ml. of 5 N sodium hydroxide and 20 g. of sodium chloride were then added. The mixture was placed in an ice bath and stirred for one hour. The product precipitated, was filtered, washed with 30% brine and dried at 60° C. 77.3 g. of product was recovered.

EXAMPLE 5

*Preparation of 5,7-naphthalenedisulfonic acid, 3-(2,4,6-trihydroxy-5-pyrimidinylazo)-disodium salt*

18.9 g. of amino G acid was slurried in 150 ml. of water and ice at 5° C. 20 ml. of 5 N hydrochloric acid was added, followed by dropwise addition during ½ hour of 12.5 ml. of 4 N sodium nitrite. The whole was stirred at 5° C. for 15 minutes and excess NO₂ was discharged by addition of sulfamic acid. The resulting diazo slurry was added slowly to a well-stirred slurry of 7 g. of barbituric acid in 150 ml. of H₂O and 100 ml. of 20 g./100 ml. Na₂CO₃ solution at 10° C. keeping the temperature below 10° C. and the whole at pH 8–9. The resulting bright yellow slurry was stirred in 600 ml. of boiling 10% brine and filtered hot. The whole was chilled to room temperature and filtered. The cake was washed with 50 ml. of 10% brine and dried at 75° C. for 18 hours; yield 30.08 g.

EXAMPLE 6

*Preparation of 3-naphthol-7-sulfonic acid 2-[(m[(4,6-diamino-s-triazin-2-yl) amino] phenyl) carbamoyl]-4-(2-methoxy-5-sulfophenylazo)*

2.03 g. of 4-methoxy metanilic acid was dissolved in 50 ml. of water and ice. 6 ml. of hydrochloric acid was added, followed by 0.7 g. of sodium nitrite in water. The whole was stirred for 15 minutes and a small amount of sulfamic acid added. The resulting cold solution was then slowly added (5 minutes) to a well-stirred solution of 4.67 g. of 2-[(m-[(4,6-diamo-s-triazin-2-yl)amino]-phenyl) carbamoyl]-3-naphthol-7-sulfonic acid dissolved in 100 ml. of water and 10 ml. of 5 N sodium hydroxide. The whole was stirred for 1½ hours at pH 11 and filtered with filter aid present. The filtrate was made acid to Congo Red with 5 N hydrochloric acid and the precipitate collected by filtration.

The solid was dissolved in 150 ml. of boiling water with sodium hydroxide to a positive phenolphthalein end point. The whole was filtered and 20 g. of sodium chloride added to the hot solution. The mixture was stirred at room temperature and the precipitate collected by filtration and washed with 25 ml. of 7.5% brine and dried at 75° C. in a vacuum for 18 hours; yield 5.28 g.

EXAMPLE 7

*Preparation of 3-naphthol-7-sulfonic acid, 2-carbamoyl-4-(2-methoxy-5-sulfophenylazo)*

10.2 g. of 2-amino-4-sulfoanisole was dissolved in 100 ml. of water and 30 ml. of 5 N hydrochloric acid by heating the mixture close to the boiling point. The reaction mixture was cooled to room temperature and the solution then brought to 5° C. with ice. 50 ml. of 1 N sodium nitrite was added slowly to form a diazo solution. After 15 minutes of stirring a small amount of excess NO₂ was discharged by addition of sulfamic acid. The diazo solution was added to a filtered solution of 69.2 g. of 2-hydroxy-1,6-disulfo-3-naphthoic amide dissolved in 300 ml. of water with 30 ml. of sodium hydroxide and 20.4 g. of sodium acetate monohydrate. After dissolving and filtration of the coupling compound, hydrochloric acid was added to 10° C. until the reaction mixture was acid to Congo Red. The pH was slowly raised to 6.5–7.0 by the addition of 50 ml. of 5% sodium bicarbonate and 20 ml. of 20% sodium carbonate. The whole was stirred at 20° C. for 2 hours. The bright red dye slowly began to precipitate. 90 g. of sodium chloride was added and the mixture stirred for 1½ hours. The whole was filtered and the cake washed with 50 ml. of 10% brine. The cake was dissolved in 200 ml. of boiling 10% brine and filtered using a filter aid. The filtrate was cooled to room temperature and the precipitate collected. The cake was washed with 30 ml. of 10% brine and dried at 70° C. for 2 days; yield 15.9 g.

EXAMPLE 8

*Preparation of carbanilic acid, 4-(5,7-disulfo-3-naphthylazo)-3-methyl-, 1-ethyl ester, disodium salt*

22.3 g. of direct yellow RFL base was dissolved in 150 ml. of 0.33 N sodium hydroxide. 10.8 g. of ethyl chloroformate dissolved in 75 ml. of ether was added dropwise in 1 hour with stirring at room temperature. The mixture was stirred for 19 hours and the water layer extracted with ether. The ether extract was poured into acetone, a precipitate forming, which was then digested on the steam bath. This mixture was then filtered and washed with acetone and ether; yield 22.5 g. The product was dissolved in dimethylformamide, filtered and reprecipitated by adding to acetone.

EXAMPLE 9

*Preparation of 5,7-naphthalenedisulfonic acid, 3-[4-([5-ethylhexahydro-3-(hydroxymethyl)-2-oxo-s-triazin-1-yl] methyl) amino-o-tolylazo], disodium salt*

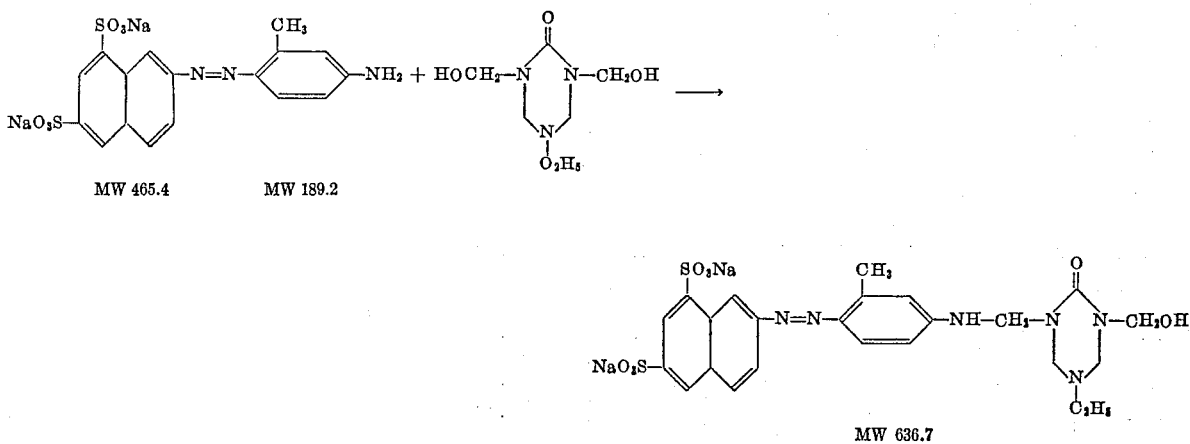

A solution was prepared containing 20.8 g. of Aerotex Resin 28 (50% solids=10.4 g.=.055 mole) and 38.2 g. (61% real=.050 mole) of direct yellow RFL base in 125 ml. of water. The pH (8.8) was adjusted to 7.1 with N/1 HCl. The mixture was then stirred at 75–80° until a nearly negative coupling test was reached (2½ hours). After standing overnight at room temperature, a reaction mixture was reheated to 75° and treated with sodium chloride. The product obtained on cooling was filtered off, washed with acetone and ether and dried under vacuum. The red-orange solid amounted to 40.4 g. On the salt-free basis (NaCl=25.8%), the yield was 88%.

EXAMPLE 10

*Preparation of 3-hydroxy-4-(2-sulfophenylazo)naphthalene-7-sulfonic acid*

52 g. of orthanilic acid was dissolved in 0.3 N sodium hydroxide, 100 cc. of water and 3 cc. of 0.3 N sodium nitrite. This mixture was then poured into 100 cc. of 10 N hydrochloric acid and ice. 89.3 g. of Schaffer Salt was almost dissolved in 12.5 cc. of water at room temperature. To this mixture was added 106 g. of sodium carbonate. The orthanilic acid mixture was then slowly added to this mixture with constant stirring and stirring continued for one hour. After one hour the mixture was heated to 90° C., 300 g. of sodium acetate trihydrate was added to the solution with continued agitation. The solution was then cooled and filtered. A portion of the filtrate was acidified with HCl until the solution was acid to Congo Red, then saturated with sodium chloride until precipitation ceased. The dye on the filter was washed with 10% sodium acetate trihydrate, dried at 70–80°, and weighed. 122 g. of product was recovered. This product was then boiled in alcohol, filtered, washed with alcohol, and dried. The final recovery of product was 108 g.

EXAMPLE 11

*Preparation of 5-(2-hydroxyphenylazo)-6-hydroxynaphthalene-2,7-disulfonic acid*

327 g. of o-amino phenol was mixed with 200 cc. of water, 30 g. of sodium chloride, 300 cc. of 0.3 N sodium nitrite, and 75 cc. of 10 N hydrochloric acid. A solution of 114 g. of R-Salt in 1 liter of water and 106 g. of sodium carbonate was then prepared. At room temperature the o-amino phenol mixture was added to the R-Salt solution with constant stirring. After diazotization was complete, 900 g. of sodium acetate trihydrate was added to the mixture and the mixture was allowed to stand overnight. A spongy mass formed which was washed with a 20% solution of sodium acetate trihydrate to remove excess sodium carbonate and R-salt. The recovered product was dried at 70° C.–80° C.; yield 142 g.

EXAMPLE 12

Chicks, four to five weeks old, were starved overnight. The following morning a commercial broiler feed diet comprising yellow corn 63%, soybean meal 20%, fish meal 5%, corn gluten meal 5%, distillers solubles 2.5%, alfalfa meal 2%, sodium chloride .5%, steamed bone meal .5%, vitamins and minerals .5%, and containing 1% calcium as calcium carbonate, supplemented with 200 p.p.m. of chlortetracycline as chlortetracycline hydrochloride and 0.5%, by weight, of the potentiating compound described below was fed to the chicks ad libitum for 3 hours. Only the control diet contained no potentiating compound. Six chicks were used in each treatment. Immediately following the 3-hour feeding period, the chicks were bled by cardiac puncture. 1½ ml. of blood was taken from each bird and assayed microbiologically. An average of the results obtained with each group of chicks is reported in Table 1 below.

TABLE 1

| Percent By Weight Supplement | Supplement | 200 p.p.m. CTC as CTC·HCl | Blood CTC mcg./ml. |
|---|---|---|---|
| Control-0 | 0 | CTC | [1] 0.127 |
| 0.5 | 8-amino-1-naphthol-5,7-disulfonic acid | CTC | .325 |
| 0.5 | 3-hydroxy-4-phenylazo-5,7-naphthalenedisulfonic acid. | CTC | .260 |
| 0.5 | 5,7-naphthalenedisulfonic acid, 3-[4-([5-ethylhexa-hydro-3-(hydroxymethyl)-2-oxo-s-triazin-1-yl]methyl) amino-o-tolylazo] disodium salt. | CTC | .237 |
| 0.5 | 5,7-naphthalenedisulfonic acid, 3-(2,4,6-trihydroxy-5-pyrimidinylazo) disodium salt. | CTC | .234 |
| 0.5 | 5,7-naphthalenedisulfonic acid, 3-(a,4-dihydroxy-m-tolylazo)-ar-sodium derivative, disodium salt. | CTC | .280 |
| 0.5 | 5,7-naphthalenedisulfonic acid, 3-amino disodium salt. | CTC | .340 |
| 0.5 | 3-naphthol-5,7 disulfonic acid | CTC | .227 |
| 0.5 | 5,7-naphthalenedisulfonic acid, 3-(4-acrylamido-o-tolylazo) disodium salt. | CTC | .250 |
| 0.5 | 1,3-naphthalene disulfonic acid | CTC | .207 |
| 0.5 | 5,7-naphthalenedisulfonic acid, 3-(4-amino-o-tolylazo) disodium salt. | CTC | .227 |
| 0.5 | 8-amino-5,7-naphthalene disulfonic acid | CTC | .193 |
| 0.5 | Carbanilic acid, 4-(5,7-disulfo-3-naphthylazo)-3-methyl, 1-ethyl ester, disodium salt. | CTC | .167 |
| 0.5 | 5,7-naphthalenedisulfonic acid-3-(p-methylaminophenylazo) disodium salt. | CTC | .153 |
| 0.5 | 5,7-naphthalenedisulfonic acid-2-[m-(m-nitrobenzamido)benzamido] disodium salt. | CTC | .220 |
| 0.5 | 3-amino-5,7-naphthalenedisulfonic acid hydrochloride. | CTC | .160 |
| 0.5 | 5,7-naphthalenedisulfonic acid-s-[4-(sulfomethylamino)-o-tolylazo] trisodium salt. | CTC | .177 |
| Control-0 | 0 | CTC | [2] .135 |
| 0.5 | 8-amino-1-naphthol-5,7-disulfonic acid | CTC | [2] .280 |
| 0.5 | 3-naphthol-7-sulfonic acid, 2-carbamoyl-4-(2-methoxy-5-sulfophenylazo). | CTC | .190 |
| 0.5 | 3-naphthol-7-sulfonic acid-2-[(m-[(4,6-diamino-s-triazin-2-yl) amino] phenyl) carbamoyl]-4-(2-methoxy-5-sulfophenylazo). | CTC | .177 |
| 0.5 | 2-naphthol-6-sulfonic acid, 3[(m-aminophenyl) carbamoyl]. | CTC | .183 |
| 0.5 | 3-naphthol-7-sulfonic acid-2-[(m-[(4,6-diamino-s-triazin-2-yl) amino] phenyl) carbamoyl]. | CTC | .160 |
| 0.5 | 2,7-naphthalenedisulfonic acid-4,5-dihydroxy-3-(6-methoxy-4-nitro-m-tolylazo). | CTC | .180 |
| 0.5 | 4-naphthol-2,7-disulfonic acid, 5-amino-3-(4-chloro-6-sulfo-3-tolylazo) trisodium salt. | CTC | .153 |
| 0.5 | 5-amino-4-hydroxy-6-(4-nitrophenylazo)-3-phenylazo-2,7-naphthalene disulfonic acid. | CTC | .223 |
| 0.5 | disodium 8-amino-1-hydroxy-7-(3-nitrophenylazo)-2-phenylazonaphthalene-3,6-disulfonate. | CTC | .210 |
| 0.5 | 1,5-naphthalenedisulfonic acid-7-[p-(p-aminobenzamido)-benzamido] disodium salt. | CTC | .263 |
| Control-0 | 0 | CTC | .075 |
| 0.5 | 8-amino-1-naphthol-5,7-disulfonic acid | CTC | .210 |
| 0.5 | 3-hydroxy-4-(2-sulfophenylazo) naphthalene-7-sulfonic acid. | CTC | .240 |
| Control-0 | 0 | CTC | .058 |
| 0.5 | 8-amino-1-naphthol-5,7-disulfonic acid | CTC | .166 |
| 0.5 | 5-(m-tolylazo)-6-hydroxynaphthalene-2,7-disulfonic acid. | CTC | .086 |
| 0.5 | 5-(2-hydroxyphenylazo)-6-hydroxynaphthalene-2,7-disulfonic acid. | CTC | .093 |

[1] Average of 9 tests.
[2] Average of 6 tests.

It will be noted from the results in Table 1 above, that in all instances where the potentiating agents were incorporated in a diet containing chlortetracycline, increase in blood levels of chlortetracycline occurred. In many instances the blood levels of chlortetracycline doubled and in others it was found to be nearly three times that obtained with the control diet which contained no potentiating agent.

EXAMPLE 13

Following the procedure set forth in Example 12, groups of six chicks were fed a commercial broiler feed diet containing 0.8% calcium as calcium carbonate, supplemented with 500 p.p.m. of a selected tetracycline antibiotic and about 0.5% of a potentiating agent. Control tests were run with diets containing 500 p.p.m. of the selected antibiotic but no potentiating agent. The results of these tests are reproduced in Table 2 below.

TABLE 2

| Percent by Weight Supplement | Supplement | 500 p.p.m. antibiotic | | | |
|---|---|---|---|---|---|
| | | Blood CTC[1] mcg./ml. | Blood DMCTC[1] mcg./ml. | Blood TC[1] mcg./ml. | Blood OTC[1] mcg./ml. |
| Control-0 | 0 | 0.17 | .17 | .17 | .13 |
| 0.5 | 8-amino-1-naphthol-5,7-disulfonic acid | 0.38 | .27 | .27 | .25 |
| 0.4 | TPA | 0.28 | .18 | .20 | .21 |
| 0.5+0.4 | 8-amino-1-naphthol-5,7-disulfonic acid + TPA | 0.59 | .57 | .43 | .28 |
| 0.9 | 8-amino-1-naphthol-5,7-disulfonic acid | 0.40 | .33 | .28 | .26 |
| 0.9 | TPA | 0.29 | .25 | .25 | .21 |

[1] CTC=Chlortetracycline.
DMCTC=Demethylchlortetracycline.
OTC=Oxytetracycline.
TPA=Terephthalic acid.
TC=Tetracycline.

The results shown in Table 2 clearly establish the potentiating effect of the compounds of the subject invention with respect to the tetracycline antibiotics. Moreover, they establish that certain compounds of the subject invention increase blood levels of antibiotic considerably above those levels obtainable with known potentiators such as terephthalic acid. Additionally, they show that with known potentiators, such as terephthalic acid, blood levels from a given amount of a tetracycline antibiotic can not be significantly increased above that which is obtainable with the optimum dosage of such potentiator. Even at approximately twice the optimum dosage, blood levels of antibiotic remain essentially unchanged.

Finally, and perhaps most importantly, the results in Table 2 clearly establish that the compounds can be used in combination with known potentiating agents to increase the blood levels of antibiotic far above those obtainable with such agents even when such agents are employed at dosage levels far exceeding their optimum levels. This discovery suggests that the physiological mechanism which produces increased antibiotic blood levels with known potentiating agents such as terephthalic acid is quite different from that mechanism which produces increased antibiotic blood levels with the compounds of the subject invention. While the exact mechanism is not known, it is thought that compounds of the subject invention increase the blood level of tetracycline antibiotics by increasing intestinal absorption. It is believed that potentiating effect of compounds such as tetrephthalic acid increase the blood level of the tetracycline antibiotics by reducing kidney excretion of the antibiotic.

EXAMPLE 14

To further illustrate the beneficial effects produced by the novel adjuvants in combination with known potentiating agents, the following tests were conducted.

A pulverized corn diet containing 1% calcium as calcium carbonate and 200 p.p.m. of chlortetracycline as the hydrochloride salt thereof was prepared. To this diet was added .5% by weight of the potentiator to be tested. The mixture was placed in stainless steel containers and tumbled for ½ hour to assure thorough mixing. The test diets thus prepared were then fed ad libitum for three hours to groups of five-week-old chicks which had been starved overnight. After 3 hours feeding time the chicks were bled by cardiac puncture and the blood biologically assayed for chlortetracycline.

The results obtained were similar to those obtained in the above-mentioned tests, and the results are reported in Table 3 below.

TABLE 3

| Diet | CaCO₃ Percent Ca | TPA[1] 0.5% | 8-amino-1-naphthol-5,7-disulfonic acid 0.5% | EDTA[1] 0.5% | Blood CTC mcg./ml. | Response |
|---|---|---|---|---|---|---|
| Control | 1.0 | − | − | − | 0.026 | 100 |
| Do | 1.0 | + | − | − | 0.096 | 369 |
| Do | 1.0 | − | + | − | 0.252 | 969 |
| Do | 1.0 | − | − | + | 0.085 | 327 |
| Do | 1.0 | + | + | − | 0.572 | 2200 |
| Do | 1.0 | + | − | + | 0.104 | 400 |
| Do | 1.0 | − | + | + | 0.338 | 1300 |
| Do | 1.0 | + | + | + | 0.598 | 2300 |

[1] TPA=Terephthalic acid.
EDTA=Ethylenediamine tetra-acetic acid.
Diet—pulverized corn.
CTC—200 p.p.m. from CTC.HCl.
Age of chicks—35 days.
Feeding period—3 hours.
Chicks per treatment—6.

The following tests illustrate the increased bactericidal or therapeutic activity of chlortetracycline produced by the incorporation of a potentiating agent in a poultry diet containing chlortetracycline.

EXAMPLE 15

A broiler feed diet of the formulation set forth below was employed.

Formulation: Lbs./ton
  Corn yellow, fine ground _____ 1200
  Soybean, fine ground (44%) _____ 400
  Corn gluten meal _____ 100
  Fish meal _____ 100
  Alfalfa meal _____ 40
  Distiller solubles _____ 50
  Mico mix 8009 limecrest+MnSo₄ _____ 40
  Bone meal (steamed) _____ 30
  NaCl _____ 10
  Choline chloride (25%) _____ 2
  Fortafeed (2-49C) _____ 2

Formulation:—Continued lbs./ton

Fortafeed 2–49C { 2 g. riboflavin / 4 g. pantothenic/lb. / 9 g. niacin / 10 g. choline } 5

Vitamin A+D, dry (Nopcay) { 2,000 u./g. $D_3$ / 10,000 u./g. A } 2

Profactor–B, mg./ton ___ 10

Two types of control tests were run simultaneously with the tests for increased activity produced by incorporation of a potentiating agent in the feed. In one control, the above diet contained no medication. In the other, .0125% by weight of chlortetracycline was added as a supplement to the diet. In the testing for increased activity, .3% by weight of 8-amino-1-naphthol-5,7-disulfonic acid and .0125% by weight of chlortetracycline was added to the diet.

Diets, medicated and unmedicated, were presented to equal weight groups of ten chicks each, two days prior to oral inoculation with 5000 sporulated oocysts of *Eimeria acervulina* (etiological agent for one form of intestinal coccidiosis in chickens) and a sufficient number of sporulated oocysts of *Eimeria tenella* (etiological agent for cecal coccidiosis in chickens) to produce about 80% mortality in the untreated control groups. They were permitted feed and water ad libitum.

Two days after presentation of the feed sporulated oocysts of *E. tenella* and *E. acervulina* were inoculated directly into the crops of all of the birds in the test by means of a plastic tube attached to a syringe. On the fourth day after inoculation group weights were taken and from these the average percent weight gain was calculated. The test was terminated on the eighth day after inoculation. Birds in "active" groups were again weighed to determine percent weight gain.

The results of these tests are reported in Table 4 below and from these results it can be seen that a noticeable increase in the activity of the antibiotic was achieved with incorporation of a potentiating agent in the diet.

TABLE 4

| Diet | Drug | Alive/Total at end of test | Percent Weight Gain 4th day | Percent Weight Gain 8th day |
| --- | --- | --- | --- | --- |
| Control test as described above | Nothing added | 1/10 | 40 | |
| Do | Nothing added | 3/10 | 38 | |
| Do | .011% CTC | 5/10 | 59 | 66 |
| Do | .022% CTC | 7/10 | 56 | 64 |
| Do | .0125% CTC | 3/10 | 60 | 88 |
| Do | .3% 8-amino-1-naphthol-5,7 disulfonic acid plus .011% CTC | 9/10 | 63 | 82 |
| Do | .3% 8-amino-1-naphthol-5,7 disulfonic acid plus .0125% CTC | 9/10 | 65 | 92 |
| Do | .3% 8-amino-1-naphthol-5,7 disulfonic acid plus .0125% CTC | 10/10 | 72 | 84 |

Adding .3% of a potentiating agent to the diet containing chlortetracycline doubled the activity of the chlortetracycline against *E. tenella*. This is evidenced by the fact that only eight of the twenty birds treated with chlortetracycline alone in the diet were still alive at the end of the test period, whereas twenty-eight of the thirty birds treated with chlortetracycline and the potentiating agent were alive at the end of the test period. It should also be noted that increasing the concentration of chlortetracycline from .011% to .022% in a diet containing chlortetracycline as the only medication reduced the number of deaths in groups of 10 chicks from 5 to 3; whereas, employing .011% chlortetracycline and supplementing this with .3% of the potentiating agent reduced the number of deaths in groups of 10 chicks from 5 to 1.

EXAMPLE 16

To further illustrate the effectiveness of the combination of the novel potentiators with chlortetracycline and terephthalic acid against disease, tests were run according to the procedure set forth in Example 15 above. Infected and uninfected controls were run simultaneously with test groups administered a variety of medicated feeds. The basic diet employed was the same as that employed in Example 15 above and the type and quantity of medication added to the diet can be readily determined from Table 5 below.

TABLE 5

| P.p.m. of CTC Added to Diet | P.p.m. of 8-amino-1-naphthol-5, 7-disulfonic acid added to diet | P.p.m. of TPA Added to Diet | No. Alive/Total No. 7 days after Inoculation |
| --- | --- | --- | --- |
| 0[1] | [1]0 | [1]0 | [1]10/10 |
| 0[2] | [2]0 | [2]0 | [2]2/20 |
| 125 | 0 | 0 | 7/20 |
| 250 | 0 | 0 | 18/20 |
| 125 | 3,000 | 0 | 19/20 |
| 60 | 3,000 | 5,000 | 15/20 |
| 125 | 3,000 | 5,000 | 19/19 |

[1] Uninfected.
[2] Infected.

From these results it will be noted that the addition of 3000 p.p.m. of 8-amino-1-naphthol-5,7-disulfonic acid to a feed containing 125 p.p.m. of chlortetracycline, more than doubled the activity of the chlortetracycline against *E. tenella*. It may also be noted that the combination of 3000 p.p.m. of 8-amino-1-naphthol-5,7-disulfonic acid, 5000 p.p.m. of terephthalic acid and 60 p.p.m. of chlortetracycline was more than twice as effective as 125 p.p.m. of chlortetracycline alone.

EXAMPLE 17

The novel adjuvants in combination with chlortetracycline were also found to be effective against *Salmonella gallinarum* in chicks. In the following tests chicks infected with the above organism were fed a standard-broiler-feed diet, as described in Example 12, containing various quantities of chlortetracycline in combination with varying amounts of 8-amino-1-naphthol-5,7-disulfonic acid. The results of these tests are provided in Table 6 below.

TABLE 6
[Effectiveness against *S. gallinarum*, all chicks infected]

| Dose Level Chlortetracycline, Percent | Dose Level 8-amino-1-naphthol-5,7-disulfonic acid, Percent | No. Alive/Total No. 20 days after Inoculation |
| --- | --- | --- |
| 0 | 0 | 2/60 |
| .025 | 0 | 4/60 |
| .025 | 0.4 | 16/60 |
| .05 | 0 | 10/60 |
| .05 | 0.4 | 24/60 |
| .1 | 0 | 30/60 |
| .1 | 0.4 | 55/60 |

The combination of chlortetracycline and adjuvant were also found to be effective against *Mycoplasma gallisepticum* (PPLO) in chicks. Noticeable increase of activity was recorded when 200 p.p.m. of chlorotetracycline and 0.24%, by weight, of 8-amino-1-naphthol-5,7-disulfonic acid were incorporated in a standard broiler feed and fed to chicks infected with *Mycoplasma gallisepticum*.

We claim:

1. An animal feed composition effective in accelerating the growth rate and combating disease of non-ruminants which comprises a nutritionally-balanced animal feed to which as added from about 50 to 1000 parts per million based on the weight of the feed of a tetracycline antibiotic and from about 1 to 5 parts by weight per 1,000 parts by weight of the feed of a compound of the formula 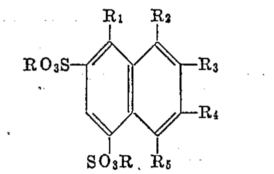 wherein R is a member of the group consisting of H and alkali metal; $R_1$ is a member of the group consisting of H and $NH_2$; $R_2$ is a member of the group consisting of H and OH; $R_3$ is a member of the group consisting of H and 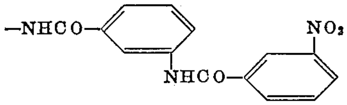 $R_4$ is a member of the group consisting of H, $NH_2$, OH, $NH_2 \cdot HCl$, $NH-C(=NH)-NH-C(=NH)-NH$ and —N=N—Z wherein Z is a member of the group consisting of phenyl, 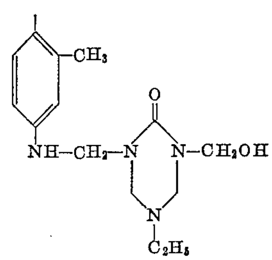 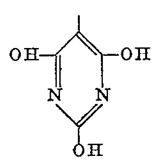 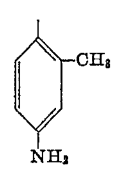 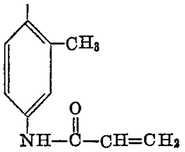 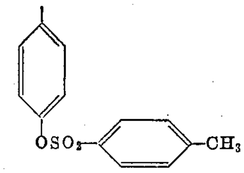 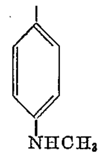 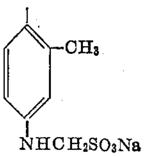 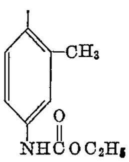 and 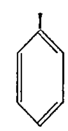 and $R_5$ is a member of the group consisting of H and phenylazo.

2. An animal feed composition according to claim 1 in which the tetracycline antibiotic is chlortetracycline.

3. An animal feed composition according to claim 1 which also contains terephthalic acid.

4. An animal feed composition effective in accelerating the growth rate and combating disease of non-ruminants which comprises a nutritionally-balanced animal feed to which is added from about 50 to 1000 parts per million based on the weight of the feed of a tetracycline antibiotic and from about 1 to 5 parts by weight per 1000 parts by weight of the feed of a compound of the group consisting of 8-amino-1-naphthol-5,7-disulfonic acid;
3-hydroxy-4-phenylazo-5,7-naphthalenedisulfonic acid;
5,7-naphthalenedisulfonic acid, 3-[4-([5-ethylhexahydro-3-(hydroxymethyl) - 2-oxo-s-triazin-1-yl]methyl)amino-o-tolylazo] disodium salt;
5,7-naphthalenedisulfonic acid, 3-(2,4,6-trihydroxy-5-pyrimidinylazo)disodium salt;
5,7-naphthalenedisulfonic acid, 3-(a-4-dihydroxy-m-tolylazo-ar-sodium derivative, disodium salt;
5,7-naphthalenedisulfonic acid, 3-amino disodium salt;
3-naphthol-5,7 disulfonic acid;
5,7-naphthalenedisulfonic acid, 3-(4-acrylamido-o-tolylazo) disodium salt;
1,3-naphthalene disulfonic acid;
5,7-naphthalenedisulfonic acid, 3-(4-amino-o-tolylazo)disodium salt;
8-amino-5,7-naphthalene disulfonic acid;
carbanilic acid, 4-(5,7-disulfo-3-naphthylazo)-3-methyl, 1-ethyl ester, disodium salt;
5,7-naphthalenedisulfonic acid-3-(p-methylaminophenylazo) disodium salt;
5,7-naphthalenedisulfonic acid-2-[m(m-nitrobenzamido) benzamido] disodium salt;
3-amino-5,7-naphthalenedisulfonic acid hydrochloride;
5,7-naphthalenedisulfonic acid-s-[4-(sulfomethylamino)-o-tolylazo] trisodium salt;
3-naphthol-7-sulfonic acid, 2-carbamoyl-4-(2-methoxy-5-sulfophenylazo);

3-naphthol - 7-sulfonic acid-2-[(m-[4,6-diamino-s-triazin-2-yl) amino]phenyl) carbamoyl]-4-(2-methoxy-5-sulfophenylazo);
2-naphthol-6-sulfonic acid, 3[(m-aminophenyl) carbamoyl];
3-naphthol-7-sulfonic acid-2-[(m-[(4,6-diamino-s-triazin-2-yl)amino]phenyl) carbamoyl];
2,7-naphthalenedisulfonic acid-4,5-dihydroxy-3-(6-methoxy-4-nitro-m-tolylazo);
4-naphthol-2,7-disulfonic acid, 5-amino-3(4-chloro-6-sulfo-3-tolylazo) trisodium salt;
5-amino-4-hydroxy-6-(4-nitrophenylazo-3-phenylazo-2,7-naphthalene disulfonic acid;
disodium 8-amino-1-hydroxy-7-(3-nitrophenylazo)-2-phenylazonaphthalene-3,6-disulfonate;
1,5-naphthalenedisulfonic acid-7-[p-(p-aminobenzamido)-benzamido] disodium salt;
3-hydroxy-4-(2-sulfophenylazo) naphthalene-7-sulfonic acid;
5-(m-tolyhazo)-6-hydroxynaphthalene-2,7-disulfonic acid;
and 5-(2-hydroxyphenylazo)-6-hydroxynaphthalene-2,7-disulfonic acid.

References Cited by the Examiner
UNITED STATES PATENTS

| | | | |
|---|---|---|---|
| 2,649,480 | 8/1953 | Regna | 260—559 |
| 2,832,718 | 4/1958 | Weidenheimer | 167—65 |
| 2,855,340 | 10/1958 | Kent | 167—53 |
| 2,895,993 | 7/1959 | Stephens | 260—559 |

FOREIGN PATENTS 828,726  11/1956  Great Britain.

JULIAN S. LEVITT, *Primary Examiner.*

LEWIS GOTTS, *Examiner.*

SAM ROSEN, *Assistant Examiner.*